(12) United States Patent
Tyler et al.

(10) Patent No.: US 11,881,552 B2
(45) Date of Patent: Jan. 23, 2024

(54) CELL TO HEAT SINK THERMAL ADHESIVE

(71) Applicant: CPS Technology Holdings LLC, New York, NY (US)

(72) Inventors: Matthew R. Tyler, New York, NY (US); Xugang Zhang, Shorewood, WI (US)

(73) Assignee: CPS Technology Holdings LLC, New York, NY (US)

( * ) Notice: Subject to any disclaimer, the term of this patent is extended or adjusted under 35 U.S.C. 154(b) by 557 days.

(21) Appl. No.: 16/886,407

(22) Filed: May 28, 2020

(65) Prior Publication Data

US 2020/0295325 A1 Sep. 17, 2020

Related U.S. Application Data

(63) Continuation of application No. 14/815,447, filed on Jul. 31, 2015, now Pat. No. 10,700,317.
(Continued)

(51) Int. Cl.
 *H01M 10/0525* (2010.01)
 *H01M 10/613* (2014.01)
 (Continued)

(52) U.S. Cl.
 CPC ....... *H01M 10/0525* (2013.01); *C09J 163/00* (2013.01); *H01M 10/0413* (2013.01);
 (Continued)

(58) Field of Classification Search
 None
 See application file for complete search history.

(56) References Cited

U.S. PATENT DOCUMENTS

| 5,483,143 A | 1/1996 | Hall et al. |
| 8,404,375 B2 | 3/2013 | Gaben |

(Continued)

FOREIGN PATENT DOCUMENTS

| CN | 103718374 A | 4/2014 |
| DE | 102008059960 B4 | 7/2013 |

(Continued)

OTHER PUBLICATIONS

3m: "Thermally Conductive Epoxy Adhesive TC-2707 Product Description," http://multimedia.3m/com/mws/media/1429140/3mtm-thermally-conductive-epoxy-adhesive-tc-2707.pdf, Aug. 1, 2014, pp. 1-5.

(Continued)

*Primary Examiner* — Gregg Cantelmo
*Assistant Examiner* — Heng M. Chan
(74) *Attorney, Agent, or Firm* — Boardman & Clark LLP

(57) ABSTRACT

A battery module includes a housing having an opening and an electrochemical cell disposed in the housing. The electrochemical cell includes a first cell surface having electrode terminals and an second cell surface substantially opposite the first cell surface. The battery module also includes a heat sink integral with the housing and a thermally conductive adhesive bonded to the second cell surface and a heat sink surface that is facing the second cell surface. The thermally conductive adhesive can include a bonding shear strength and bonding tensile strength between the electrochemical cell and the heat sink of between approximately 5 megaPascals (MPa) and 50 MPa.

20 Claims, 5 Drawing Sheets

Related U.S. Application Data

(60) Provisional application No. 62/146,811, filed on Apr. 13, 2015, provisional application No. 62/146,763, filed on Apr. 13, 2015, provisional application No. 62/146,816, filed on Apr. 13, 2015.

(51) Int. Cl.

| | |
|---|---|
| *H01M 10/625* | (2014.01) |
| *H01M 10/653* | (2014.01) |
| *H01M 10/6551* | (2014.01) |
| *H01M 10/6554* | (2014.01) |
| *H01M 10/04* | (2006.01) |
| *C09J 163/00* | (2006.01) |
| *H01M 10/058* | (2010.01) |
| *H01M 10/6555* | (2014.01) |
| *H01M 50/24* | (2021.01) |
| *H01M 50/267* | (2021.01) |
| *H01M 50/55* | (2021.01) |
| *H01M 50/553* | (2021.01) |
| *H01M 10/658* | (2014.01) |
| *H01M 50/209* | (2021.01) |
| *H01M 50/264* | (2021.01) |
| *H01M 10/647* | (2014.01) |
| *H01M 50/507* | (2021.01) |
| *H01M 50/516* | (2021.01) |

(52) U.S. Cl.
CPC ....... *H01M 10/058* (2013.01); *H01M 10/613* (2015.04); *H01M 10/625* (2015.04); *H01M 10/653* (2015.04); *H01M 10/658* (2015.04); *H01M 10/6551* (2015.04); *H01M 10/6554* (2015.04); *H01M 10/6555* (2015.04); *H01M 50/209* (2021.01); *H01M 50/24* (2021.01); *H01M 50/264* (2021.01); *H01M 50/267* (2021.01); *H01M 50/55* (2021.01); *H01M 50/553* (2021.01); *H01M 10/647* (2015.04); *H01M 50/507* (2021.01); *H01M 50/516* (2021.01); *H01M 2220/20* (2013.01)

(56) References Cited

U.S. PATENT DOCUMENTS

| | | | |
|---|---|---|---|
| 8,574,739 B2 | 11/2013 | Shen et al. | |
| 9,040,185 B2 | 5/2015 | Chuang et al. | |
| 9,163,887 B2 | 10/2015 | Katayama et al. | |
| 9,203,064 B2 | 12/2015 | Lee et al. | |
| 9,225,035 B1 | 12/2015 | Werre et al. | |
| 9,236,590 B2 | 1/2016 | Aoki | |
| 10,700,317 B2 | 6/2020 | Tyler et al. | |
| 2005/0061429 A1* | 3/2005 | Hosaka | G03F 7/038 156/275.7 |
| 2010/0151308 A1 | 6/2010 | Hermann et al. | |
| 2010/0291419 A1 | 11/2010 | Zhou | |
| 2011/0214808 A1 | 9/2011 | Hermann | |
| 2012/0263988 A1 | 10/2012 | Obasih et al. | |
| 2013/0023605 A1* | 1/2013 | Hoevel | C08K 3/36 523/466 |
| 2013/0337310 A1 | 12/2013 | Omura et al. | |
| 2014/0154547 A1 | 6/2014 | Anderson et al. | |
| 2014/0234689 A1 | 8/2014 | Kim et al. | |
| 2015/0064540 A1 | 3/2015 | Roh et al. | |

FOREIGN PATENT DOCUMENTS

| | | |
|---|---|---|
| EP | 2744034 B1 | 2/2015 |
| EP | 2557627 B1 | 4/2016 |
| WO | 9905746 A1 | 2/1999 |
| WO | 2009029138 A2 | 3/2009 |
| WO | 2012117681 | 9/2012 |
| WO | 2012125115 | 9/2012 |
| WO | 2012147801 A1 | 11/2012 |

OTHER PUBLICATIONS

Check-Stock: "Ther-0-Bond 1500 MSDS Safety Sheet for Ther-0-Bond 1500 Resin MSDS Safety Sheet for Ther-0-Bond 1500 Hardener Thermal Adhesive Home Products Solutions Aavid Design Tools & Docs Contact Company Online Store", http://www1.futureelectronics.com/doc/AAVID THERMALLOY/4952G.pdf, Jun. 1, 2012, pp. 1-5.

Na Zahonech: "Technical Data Sheet Letoxit PL 50", http://www.5m.cz/userfiles/file/Lepidla EN/TL PL 50 EN.pdf, Nov. 1, 2011, pp. 1-2.

PCT/US2016/018449 Invitation to Pay Additional Fees mailed Jun. 16, 2016.

3M Company, "3MTM Thermally Conductive Epoxy Adhesive TC-2707", Jan. 31, 2009.

\* cited by examiner

CELL TO HEAT SINK THERMAL ADHESIVE

CROSS-REFERENCE TO RELATED APPLICATION

This application is a continuation of and claims priority to U.S. Nonprovisional application Ser. No. 14/815,447, filed Jul. 31, 2015, entitled "CELL TO HEAT SINK THERMAL ADHESIVE," now U.S. Pat. No. 10,700,317, which claims priority from and the benefit of U.S. Provisional Application No. 62/146,811, filed Apr. 13, 2015, entitled "B-CARRIER TO CELL TO THERMAL EPOXY INTERFACE DESIGN FOR MANAGING CELL HEIGHT," U.S. Provisional Application No. 62/146,763, filed Apr. 13, 2015, entitled "CELL TO CELL ADHESIVE TAPE," and U.S. Provisional Application No. 62/146,816, filed Apr. 13, 2015, entitled "CELL TO HEAT SINK THERMAL EPOXY," all of which are hereby incorporated herein by reference in their entireties for all purposes.

U.S. Nonprovisional application Ser. No. 14/815,447 is related to U.S. Non-Provisional application Ser. No. 14/815,415, entitled "ADHESIVE TAPE FOR POSITIONING BATTERY CELLS IN A BATTERY MODULE," filed on Jul. 31, 2015, now U.S. Pat. No. 10,403,869, and U.S. Non-Provisional application Ser. No. 14/815,515, entitled "THERMAL EPOXY AND POSITIONING OF ELECTROCHEMICAL CELLS," filed on Jul. 31, 2015, both of which are incorporated herein by reference in their entireties for all purposes.

BACKGROUND

The present disclosure relates generally to the field of batteries and battery modules. More specifically, the present disclosure relates to thermal management in lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, traditional battery modules generally include electrochemical cells disposed within a battery housing. Due, in part, to size differences between the electrochemical cells within the battery module and vibrations during operation of vehicles, the electrochemical cells may move within the battery housing. Movement of the electrochemical cells may result in stress and high loads on certain battery components. Accordingly, it is now recognized that decreased movement of electrochemical cells in a battery module is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with a first embodiment, a battery module includes a housing having an opening and an electrochemical cell disposed in the housing. The electrochemical cell includes a first cell surface having electrode terminals and a second cell surface substantially opposite the first cell surface. The battery module also includes a heat sink integral with the housing and disposed substantially opposite the opening of the housing and a thermally conductive adhesive bonded to the second cell surface and a heat sink surface that is facing the second cell surface. The thermally conductive adhesive includes a bonding shear strength and bonding tensile strength between the electrochemical cell and the heat sink of greater than 5 megaPascals (MPa) and less than 50 MPa.

In accordance with a second embodiment, a method of manufacturing a battery module including applying an adhesive to a housing of the battery module at an interface between an electrochemical cell and a heat sink of the battery module. The adhesive includes a viscosity of between approximately 40,000 centipoise (cP) and approximately 50,000 cP and a working life of between approximately 1 hour and approximately 3 hours. The method also includes inserting the electrochemical cell into the opening toward the heat sink after applying the adhesive and curing the adhesive to secure the electrochemical cells to the heat sink at the interface.

In accordance with a third embodiment, a battery module including an electrochemical cell secured to a heat sink coupled to a housing of the battery module. The heat sink extends in at least one direction to an outermost dimension of the housing. The electrochemical cell is secured to the heat sink by a process including applying a thermally conductive adhesive to an interface between the electrochemical cell and the heat sink. The thermally conductive adhesive includes a viscosity of between approximately 40,000 centipoise (cP) and approximately 50,000 cPs and a working life of between approximately 1 hour and approximately 3 hours. The process also includes curing the thermally conductive adhesive to secure the electrochemical cells to the heat sink at the interface.

In accordance with a fourth embodiment, an adhesive for securing an electrochemical cell to a housing of a battery module including a mixture including a ratio of between 1:1 and 2:1 epoxy resin to hardener that when cured forms the adhesive, a viscosity between approximately 40,000 centipoise (cP) and approximately 50,000 cP, and a working life of between approximately 1 hour and approximately 3 hours. The adhesive is thermally conductive and includes an aluminum-to-aluminum bond strength of between approximately 5 megaPascals (MPa) and approximately 50 MPa.

DRAWINGS

Various aspects of this disclosure may be better understood upon reading the following detailed description and upon reference to the drawings in which.

Figure 3:
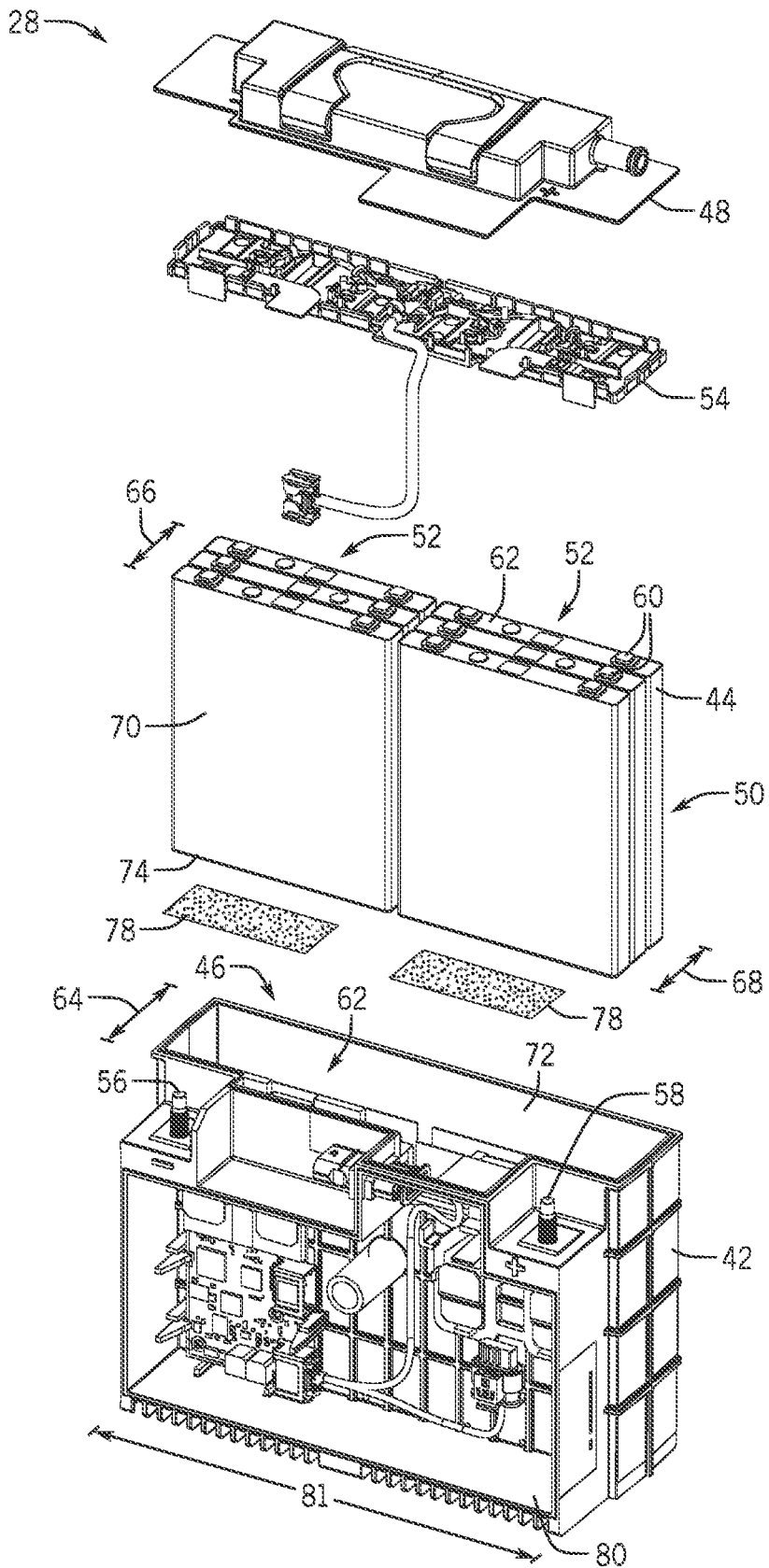
FIG. 3 is a perspective view of an embodiment of components of a lithium ion battery module that may be used with the vehicles of FIGS. 1 and 2, the battery module having an adhesive that secures electrochemical cells within a housing of the lithium ion battery module in accordance with aspects of the present disclosure.
Figure 6:
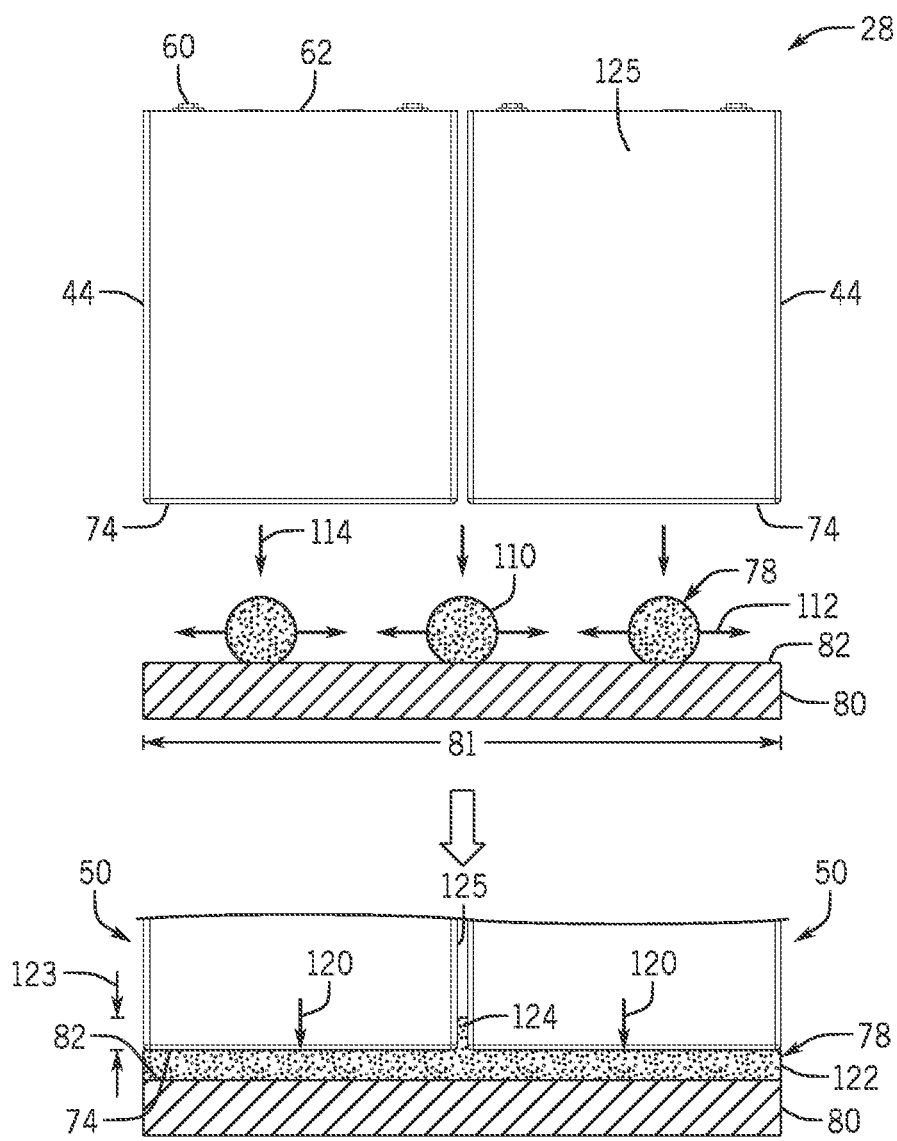
Figure 7:
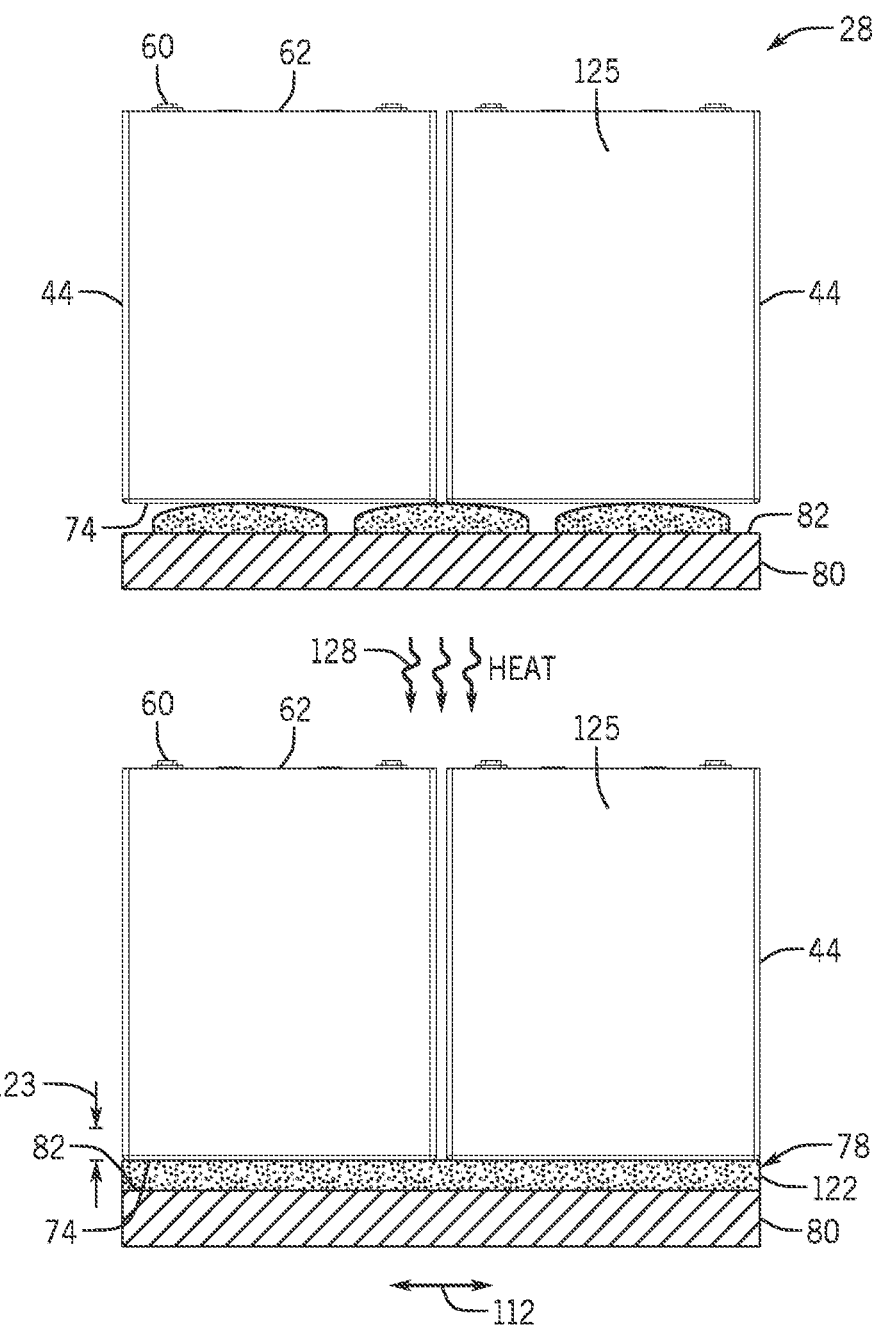

FIG. 6 is a diagram of an embodiment of a portion of the lithium ion battery module of FIG. 3 having the adhesive applied to a surface of the heat exchanger and dispersed along an interface between the heat exchanger and the electrochemical cells to form an adhesive layer between the electrochemical cells and the heat exchanger in accordance with aspects of the present disclosure; and FIG. 7 is a diagram of an embodiment of at least a portion of the lithium ion battery module of FIG. 3 having heat applied to at least a portion of the lithium ion battery module to disperse the adhesive along an interface between the electrochemical cells and the heat exchanger to form an adhesive layer between the electrochemical cells and the heat sink in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Present embodiments are generally directed toward a thermal epoxy adhesive, the adhesive being configured to couple a plurality of electrochemical cells disposed within the battery module with a heat exchanger (e.g., heat sink) of the battery module. Due to manufacturing imperfections (e.g., engineering tolerances), certain or each of the electrochemical cells may include a different height than the other electrochemical cells. Therefore, due to the variable dimensions of the electrochemical cells, the electrochemical cells may not conform to a housing of the battery module, thereby forming gaps between the housing of the battery module and the electrochemical cells. As such, the electrochemical cells may move within the battery module during operation of a vehicle powered by the battery module. The movement of the electrochemical cells may result in stress and high mechanical loading on battery components (e.g., electrochemical cell electrode terminals), which may result in, for example, stress fractures and electrolyte leakage from the electrochemical cells. The presently disclosed adhesive may mitigate the undesirable movement of the electrochemical cells by adhering (e.g., bonding) the electrochemical cells to certain battery module components (e.g., the heat exchanger). The adhesive may include various properties that provide a durable and resilient coupling between the electrochemical cells and the heat sink to mitigate cell movement and the undesirable effects resulting from the movement of the electrochemical cells during operation of the vehicle. Additionally, the adhesive may absorb at least a portion of the mechanical load resulting from operation of the vehicle, and decrease the overall stress load on the electrode terminals associated with the electrochemical cells.

Figure 1:
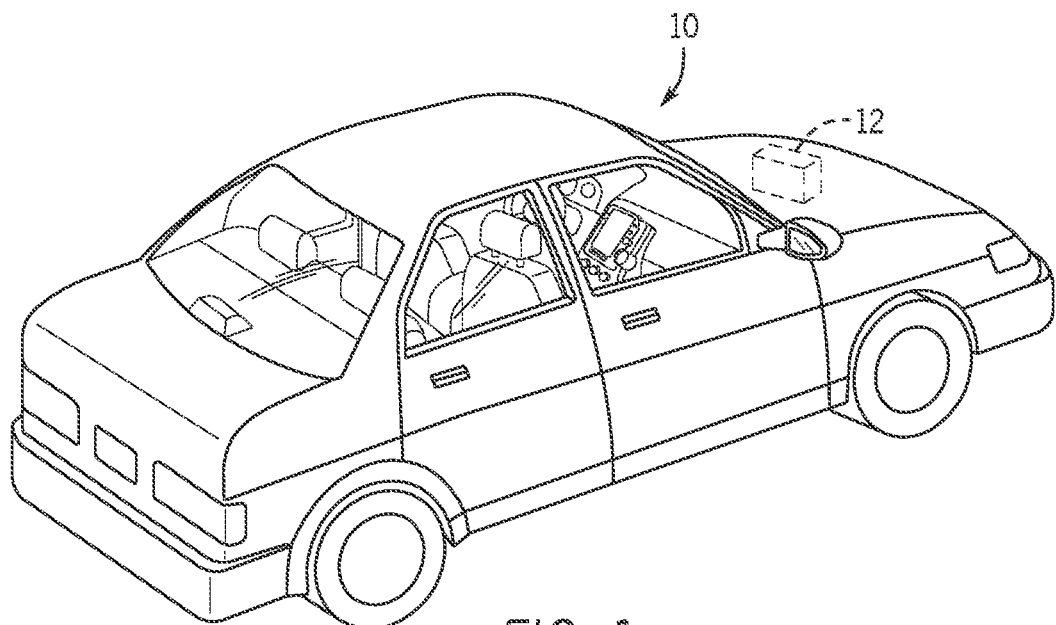
FIG. 1 is perspective view of an embodiment of a vehicle having a battery system contributing all or a portion of the motive power for the vehicle in accordance with aspects of the present disclosure.

With the foregoing in mind, the present embodiments relating to a thermal epoxy adhesive may be applied to any battery or battery system, in particular battery systems employed in an xEV (e.g., an mHEV). For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
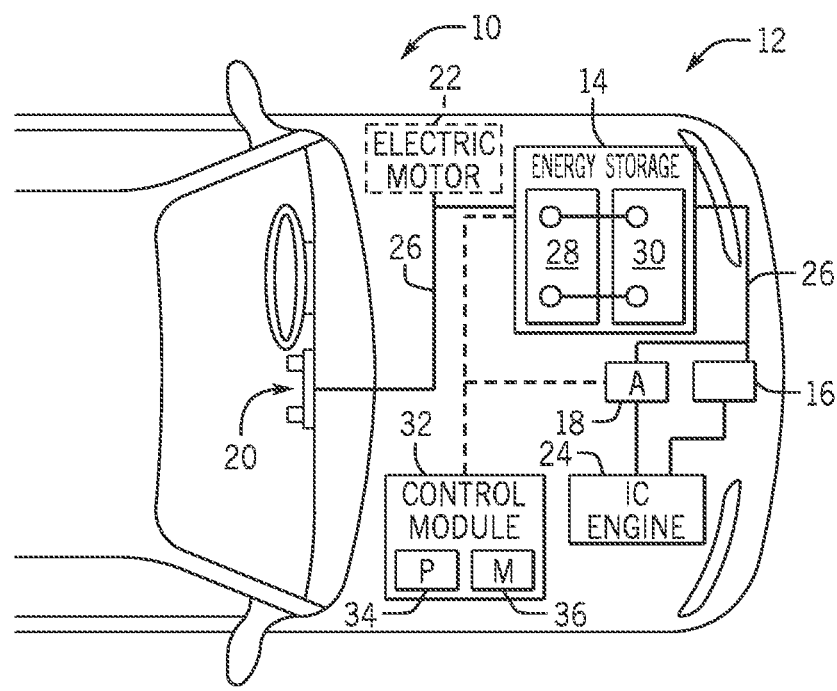
FIG. 2 illustrates a cutaway schematic representation of an embodiment of the vehicle of FIG. 1 provided in the form of a hybrid electric vehicle in accordance with aspects of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

Each lithium ion battery module 28 is responsible for packaging (e.g., housing) or containing a plurality of electrochemical cells. The overall voltage and capacity of the battery module 28 is generally determined by a number of electrochemical cells packaged in the battery module 28. FIG. 3 is a perspective view of an embodiment of the battery module 28. The battery module 28 illustrated in FIG. 3 includes a housing 42 that may be metallic (e.g., made from steel, aluminum, or another suitable metal) or may be polymeric (e.g., polypropylene, acrylonitrile butadiene styrene (ABS), a polystyrene (PS), a polyimide (PI), or another suitable polymer or plastic or combination thereof).

The housing 42 holds one or more electrochemical cells 44 (e.g., lithium-ion cells, nickel metal hydride cells, lithium polymer cells, or any other suitable electrochemical cell) of the battery module 28. The electrochemical cells 44 are disposed in the housing 42 through a housing opening 46. When the module 28 is fully assembled, a housing cover 48 is sealed over the housing opening 46 to completely enclose the electrochemical cells 44. The housing cover 48 may be manufactured from metallic or polymeric materials (e.g., polypropylene), similar to the housing 42.

The electrochemical cells 44 described herein may be prismatic battery cells, where a prismatic battery cell, as defined herein, includes a prismatic case that is generally rectangular in shape. In contrast to pouch cells, the prismatic casing is formed from a relatively inflexible, hard (e.g., metallic) material. However, it should be noted that certain of the embodiments described below may incorporate pouch cells in addition to or in lieu of prismatic battery cells. In accordance with present embodiments, each prismatic battery cell may include a top casing portion, where electrode terminals (e.g., positive and negative cell terminals) are located. One or more cell vents may also be located on the top casing portion. The prismatic cell casing also includes a bottom casing portion positioned opposite the top casing portion. First and second sides, which may be straight or rounded, extend between the bottom and top casing portions in respective positions corresponding to the electrode terminals. First and second faces, which may be flat or rounded, couple the first and second sides at opposing ends of each cell.

As discussed above, depending on the voltage and/or capacity requirements, as well as the individual voltage and coupling of each cell, the battery module 28 may include any number of the electrochemical cells 44, for example, between one and forty (e.g., six, twelve, twenty, or more electrochemical cells 44). The electrochemical cells 44 may be inserted into the housing 42 as a cell stack 50. In other embodiments, each electrochemical cell 44 may be individually indexed in trays, cell slots, or a similar structure disposed in the housing 42. Further, the housing 42 may include additional structures, such as spacers, to separate the electrochemical cells 44 or the cell stack 50 from other electrochemical cells 44 or cell stacks 50.

Depending, for example, on the desired overall housing dimensions (e.g., length and width) of the battery module 28, the electrochemical cells 44 may be arranged in separate columns 52 of the cell stack 50. By way of non-limiting example, each column 52 may have half of a total number of the electrochemical cells 44 in the battery module 28. In the illustrated embodiment, the battery module 28 includes three electrochemical cells 44 in each column 52 for a total of six electrochemical cells 44. A bus bar carrier 54 may be used to hold the electrochemical cells 44 in place within the housing 42. The bus bar 54 may include features that interface with a set number of the columns 52 in the battery module 28. The columnar arrangement of the electrochemical cells 44 may enable standardized dimensions (e.g., length and width) for the housing 42.

The electrochemical cells 44, as a group, may provide power to the electric vehicle (e.g., xEV 10) through a pair of terminals 56 and 58 that connect the battery module 28 to an electrical load (e.g., circuit). For example, in the illustrated embodiments, the electrochemical cells 44 each have a positive electrode (e.g., a cathode) and a negative electrode (e.g., an anode) enclosed within a casing (e.g., packaging) of the respective electrochemical cell. The positive and negative electrodes each have electrode terminals 60 extending through a first cell surface 62. The electrodes may be made of a conductive collector material, such as, aluminum, stainless steel, nickel, copper, or tin, depending on the desired physical properties (e.g., yield strength, electrical resistivity, chemical compatibility, and so forth) and the active material on the electrodes. In some embodiments, the electrodes are coated electrodes in which an electrode active material is coated onto the conductive collector material. For example, the positive electrode may be coated with cathode active materials such as, but are not limited to, lithium metal oxides (LMO) such as lithium nickel cobalt manganese oxide (NMC) (e.g., $LiNi_xCo_yMn_zO_2$, where x+y+z=1), lithium nickel cobalt aluminum oxide (NCA) (e.g., $LiNi_xCo_yAl_zO_2$, where x+y+z=1), lithium cobalt oxide (LCO) (e.g., $LiCoO_2$), and lithium metal oxide spinel (LMO-spinel) (e.g., $LiMn_2O_4$), and combinations thereof. Similarly, the negative electrode may be coated with anode active materials such as, but not limited to, graphite, lithium titanium oxide (LTO) and derivatives thereof, or any other suitable anode active materials.

The housing 42 may have standardized dimensions based on the voltage capacity of the battery module (e.g., 12V and 48V battery modules). However, as discussed above, the electrochemical cells 44 may have variable dimensions (e.g., a height of the cell stack 50). As such, a first cell stack dimension 66 may be different from a second cell stack dimension 68. Accordingly, without the disclosed embodiments, the electrochemical cells 44 in the cell stacks 50 may not conform to the housing 42. For example, the different cell stack dimensions 66, 68 may result in gaps between a cell stack surface 70 and a housing inner surface 72. These gaps may allow undesirable movement of the undersized cell stacks 50 within the housing 42 during operation of the vehicle.

The electrochemical cells 44 are secured to the housing 42 at the first cell surface 62 via the bus bar 54 (e.g., the bus bar 54 couples to the terminals 60 and the housing 42). However, without the disclosed embodiments, a second cell surface 74 (e.g., the surface substantially opposite the first cell surface 62) of the electrochemical cells 44 is not secured to the housing 42 or other component of the battery module 28. Accordingly, the undersized cell stacks 50 may move within the housing 42. Such movement may result in mechanical loading on, for example, the terminals 60 of the electrochemical cells 44. This loading may result in stress fractures at or near the terminals 60 and electrolyte leakage from the electrochemical cells 44. For example, the terminals 60 of each electrochemical cell 44 are coupled to the bus bar carrier 54, which is secured to the housing 42 and/or the housing cover 48. Therefore, the electrochemical cells 44 may have limited movement at or near the first cell surface 62. However, because the second cell surface 74 is not secured to the housing 42 or other battery module component, undersized cell stacks 50 (e.g., cell stacks that do not conform to the housing 42) may move at or near the second cell surface 74. It is now recognized that movement of the second cell surface 74 may be blocked by placing an adhesive 78 between the second cell surface 74 and a heat sink 80 (e.g., a heat exchanger). As shown in FIG. 3, the heat sink 80 is substantially opposite the opening 46 of the housing 42 and faces the second cell surface 74 when the electrochemical cells 44 are positioned within the housing 42.

In accordance with present embodiments, a layer of the adhesive 78 (e.g., compliant thermal epoxy) may be disposed proximate to an interface surface between the electrochemical cells 44 and the heat exchanger (e.g., the heat sink 80) of the battery module 28. For example, the layer of the adhesive 78 may be disposed between a surface of the electrochemical cells 44 (e.g., the second cell surface 74) and a surface of the heat exchanger. The layer of adhesive 78 between the surface 74 of the electrochemical cells 44 and the surface of the heat sink 80 may secure the electrochemical cells 44 to the heat sink 80, thereby decreasing movement of the electrochemical cells 44 during operation of the vehicle. Additionally, the adhesive 78 may fill spaces between the electrochemical cells 44 that are near the interface surfaces of the electrochemical cells 44 and the heat sink 80. In other words, the layer of the adhesive 78 may conform to the electrochemical cells 44 to compensate for variability in dimensions (e.g., height) of the electrochemical cells 44.

In general, the adhesive 78 mitigates movement of the electrochemical cells 44 within the battery module 28 during operation of the vehicle by adhering the bottom sides (e.g., the second surface 74) of the electrochemical cells 44 to a heat sink surface 82 of the heat sink 80 of the battery module 28. In other words, because of the bonding between the bottom sides of the electrochemical cells and the surface 82 of the heat sink 80 via the adhesive 78, the mechanical loading on certain battery components (e.g., the electrode terminals 60) may be decreased compared to battery modules that do not include the adhesive 78 at the interface between the electrochemical cells 44 and the heat sink 80. As such, battery durability may be increased and costs associated with replacement of the battery module 28 and/or the battery module components may be decreased.

Figure 4:
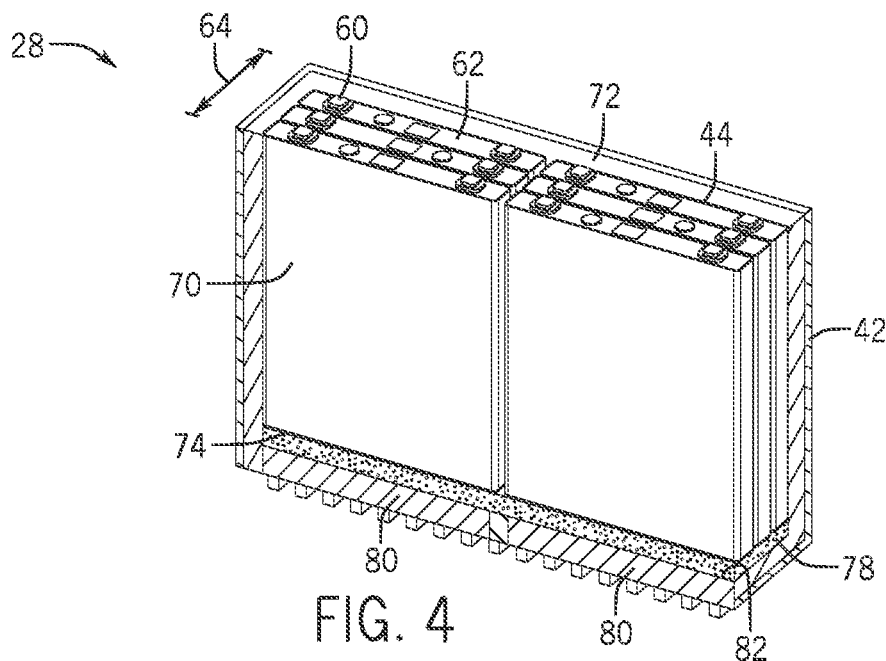
FIG. 4 is a cross-sectional view of an embodiment of the lithium ion battery module of FIG. 3 having a layer of the adhesive between the electrochemical cells and a heat exchanger of the lithium ion battery module in accordance with aspects of the present disclosure.

The heat sink 80 may be imbedded or otherwise attached to the housing 42, and may have a dimension 81 (e.g., length) that is approximately equal to an outermost dimension of the housing 42. In certain embodiments, the heat sink 80 is integrally formed within the housing 42. For example, the heat sink 80 may be overmolded such that the heat sink 80 is an integral part of the housing 42. As shown in FIG. 4, the adhesive 78 bonds (e.g., adheres) to both the second cell surface 74 and the heat sink surface 82 facing the second cell surface 74. As discussed in further detail below, the adhesive 78 may form a bond between the surfaces 74, 82, thereby coupling the electrochemical cells 44 and the heat sink 80. In this way, the electrochemical cells 44 may be secured within the housing 42 at both the first cell surface 62 (e.g., via the bus bar carrier 54) and the second cell surface 74 (e.g., via the adhesive 78). As such, undesirable movement of the electrochemical cells 44 during operation of the vehicle 10 may be mitigated. Additionally, the adhesive 78 may have thermal properties that may enhance heat exchange between the electrochemical cells 44 and the heat sink 80.

As discussed above, the adhesive 78 is disposed between the second cell surface 74 and the heat sink surface 82. Generally, both the heat sink 80 and the cell casing of the electrochemical cells 44 may be manufactured from metallic materials such as, but not limited to, aluminum, copper, steel, metal alloys, and derivatives thereof, among others. However, in certain embodiments, the electrochemical cells may have a polymeric casing.

As discussed in further detail below, the adhesive 78 may be an epoxy based adhesive. In accordance with such embodiments, the adhesive 78 may cure (e.g., harden) and build strength over time. Accordingly, it may be desirable for the adhesive 78 to have bond strength suitable for adhering to metallic surfaces (e.g., aluminum surfaces). Accordingly, the adhesive 78 may have adhesion bond strength for metal-to-metal bonding greater than approximately 5 megaPascals (MPa). By way of non-limiting example, the metal-to-metal adhesion bond strength of the adhesive 78 may be between approximately 5 MPa and approximately 50 MPa (e.g., between approximately 5 MPa and approximately 40 MPa, between approximately 10 MPa and approximately 30 MPa, or between approximately 20 MPa and approximately 25 MPa). As such delamination (e.g., separation) of the adhesive 78 at the interface between the second cell surface 74 and heat sink surface 82 may be decreased compared to adhesives that have bond strengths less than approximately 5 MPa.

Additionally, the adhesive 78 may have a bonding shear strength and bonding tensile strength for aluminum-to-aluminum bonding that is greater than or equal to approximately 5 MPa at 25 degrees Celsius (° C.). For example, in certain embodiments the bonding shear strength and the bonding tensile strength for aluminum-to-aluminum may be between approximately 5 MP and approximately 50 MPa at 25° C. This may facilitate securing the casing of the electrochemical cells 44 to the heat sink 80. For example, in certain embodiments, both the casing of the electrochemical cells 44 and the heat sink 80 are metallic (e.g., aluminum). Therefore, the bonding shear and tensile strength of the adhesive 78 is such that the adhesive 78 does not delaminate (e.g., separate) from the surfaces 74, 82. Indeed, it is now recognized that the bonding strength between 5 MPa and 50 MPa may ensure that the cells 44 will remain bonded to the heat sink 80 of the module housing 42 under shock loads that are well beyond those that would typically be experienced during operation (e.g., a "worst-case" shock load), such as 150 g (150 times the force of gravity).

The surfaces 74, 82 may be treated to increase adhesion of the adhesive 78. For example, the surfaces 74, 82 may be cleaned with solvents to remove residual contaminants (e.g., oils) resulting from manufacturing and/or handling of the electrochemical cells 44 and the heat sink 80. In certain embodiments, the surfaces 74, 82 may be texturized to increase a surface area of the surfaces 74, 82. For example, the inner surface 72 of the module housing 42 and/or the second surface 74 of the battery cells 44 (e.g., at their base) may be plasma treated to enhance adhesion. Once cured, the adhesive 78 may have a Shore D hardness of greater than or equal to 70 (e.g., between 70 and 90). It is believed that such Shore D hardness values may ensure that the adhesive 78 may remain stable during operation and prevent the adhesive 78 from displaying spring-like properties while the module 22 is in use (e.g., while the xEV 10 is in motion).

Moreover, due, in part, to the operating conditions of the vehicle 10, charging/discharging cycles, and relatively elevated ambient temperatures, the battery module 28 may be exposed to elevated ambient temperatures (e.g., in excess of approximately 100° C.). Accordingly, to mitigate undesirable effects of the elevated temperatures (e.g., heat induced degradation), the adhesive 78 may be heat resistant. Additionally, the adhesive 78 may have a low coefficient of thermal expansion to minimize volume changes (e.g., due to temperature induced expansion and compression) of the adhesive 78 during operation of the vehicle 10. For example, the adhesive 78 may have a coefficient of thermal expansion less than or equal to approximately 40 parts per million (ppm)/° C.). In certain embodiments, the coefficient of thermal expansion may be between approximately 0.5 ppm/° C. and approximately 40 ppm/° C., which may facilitate maintaining the adhesive 78 within a desired volume during, for example, charging and discharging of the battery module 28.

The heat sink 80 is configured to cool the electrochemical cells 44 by facilitating heat transfer between the electrochemical cells 44, fluid (e.g., air), and the housing 42. Therefore, because the adhesive 78 is between the surfaces 74, 82, it may be desirable for the adhesive 78 to have a suitable thermal conductivity to allow heat transfer between the electrochemical cells 44 and the heat sink 80. Accordingly, the adhesive 78 may have a thermal conductivity of greater than or equal to approximately 0.5 Watt/meter Kelvin (W/mK). By way of non-limiting example, the adhesive 78 may have a thermal conductivity of between approximately 0.5 W/mK and approximately 5 W/mK. In one embodiment, the adhesive 78 has a thermal conductivity of greater than or equal to 1.3 W/mK As discussed above, the adhesive 78 is an epoxy based adhesive. Therefore, the adhesive 78 may include an epoxy resin derived from bisphenols (e.g., Bisphenols A, F, and S), phenols, aliphatics (e.g., aliphatic alcohols and/or polyols), glycidylamine, glycidylethers, derivatives thereof, combinations thereof, or any other suitable epoxy resin having the adhesive properties disclosed herein. In certain embodiments, the adhesive 78 may include up to approximately 40 weight percent (wt %) of the epoxy resin. By way of example, the epoxy resin may be THERMOSET 340 EPOXY RESIN (available from LORD Corporation).

The epoxy resin may also include additives and/or fillers to adjust a density and/or viscosity of the adhesive 78 based on a desired method of application and/or self leveling characteristic of the adhesive 78. During manufacturing of the battery module 28, the adhesive 78 may be applied to the second cell surface 74, the heat sink surface 82, or both before insertion of the electrochemical cells 44 in the housing 42. For example, the adhesive 78 may be applied to the surfaces 74, 82 via a dispenser, a brush, dip coating (e.g., dipping the surface 74 in a solution of the adhesive 78), or any other suitable application method that applies the adhesive 78 to the surfaces 74, 82. Therefore, it may be desirable for the adhesive 78 to have a viscosity that is thick enough to remain on the surface 74, 82 without dripping (e.g., as a result of gravitational forces). For example, if the adhesive 78 is applied to the second cell surface 74, the adhesive 78 may have a viscosity such that gravitational forces placed on the electrochemical cells 44 during insertion into the housing 42 do not cause the adhesive 78 to flow along the second cell surface 74 and/or drip before the second cell surface 74 abuts the heat sink surface 82. However, the viscosity of the adhesive 78 may not be so thick as to not allow the adhesive 78 to disperse and conform to the electrochemical cells 44 and the heat sink 80 when the second cell surface 74 is pushed up against the heat sink 80.

Generally, the adhesive 78 may have a viscosity of between approximately 40,000 centipoise (cP) and 300,000 cP. More specifically, it is now recognized that the adhesive 78 may have a relative viscosity of between approximately 40,000 cP and approximately 50,000 cP (e.g., measured via Brookfield method at speed=2 revolutions per minute (rpm)) to provide the desired flow characteristics during and after application to the surface 74, 82. In other embodiments, the adhesive 78 has a viscosity of between approximately 75,000 cP and approximately 300,000 cP. However, the epoxy resin may have a relative viscosity of approximately 40,000 and approximately 50,000 cP at 25° C. (e.g., measured via Brookfield method at speed=2 rpm). Therefore, the fillers may be added to the epoxy resin to adjust the viscosity such that the adhesive 78 has the desired viscosity. In certain embodiments, the adhesive 78 may include between approximately 0.5 wt % and approximately 10 wt % of the filler. The amount of the filler in the adhesive 78 may depend on the desired viscosity and flow characteristics of the adhesive. Example fillers that may be used to achieve the desired viscosity may include carbon black, fumed silica, glass microspheres, combinations thereof, or any other suitable filler.

In addition to the epoxy resin and the fillers, the adhesive 78 may include a hardener that cures (e.g., cross-links) the epoxy resin over time. For example, the epoxy resin may be mixed with the hardener before, during, or after application of the epoxy resin onto the surfaces 74, 82 to cure the epoxy resin and yield the adhesive 78. To facilitate manufacturing of the battery module 28, it may be desirable to select a hardener that enables curing of the adhesive 78 at low temperatures (e.g., less than or equal to 100° C.) within a desired amount of time. For example, the adhesive 78 may have a full curing time of less than approximately 36 hours at a temperature of 25° C. In certain embodiments, the adhesive 78 has a full curing time of approximately 24 hours at 25° C. As used herein, the term full curing time is the time it takes the adhesive 78 to reach the desired bond strength and hardness to fixedly secure the electrochemical cells 44 and the heat sink 80.

The hardener may include any hardener suitable for use with an epoxy such as amines, acids, acid anhydrides, thiols, alcohols, phenols, or any other suitable low-temperature cure hardener. In accordance with present embodiments, the hardener may have a relative viscosity of between approximately 5,000 cP and approximately 50,000 cP at 25° C. (e.g., via Brookfield method at speed=2 rpm). It has been recognized that this viscosity may facilitate generating an adhesive (e.g., the adhesive 78) having the desired flow properties for application to the surfaces 74, 82. Additionally, the hardener selected for curing the epoxy resin is such that a working life for the adhesive 78 is greater than or equal to 30 minutes. A working life of greater than or equal to 30 minutes may allow time to adjust the housing 42 and/or electrochemical cells 44 after insertion of the electrochemical cells 44 into the housing 42 before the adhesive 78 cures and is no longer sufficiently pliable. For example, the working life for the adhesive may be between approximately 30 minutes and approximately 3 hours. In one embodiment, the working life of the adhesive 78 is between approximately 60 minutes and approximately 2 hours. For the purposes of this disclosure, the working life of the adhesive 78 is the time, after mixing the epoxy resin and the hardener, that the adhesive 78 remains liquid and is workable to allow adjustment of the electrochemical cells 44 within the housing 42. By way of example, the hardener may be THERMOSET HARDENER NO. 18 (available from LORD Corporation). The epoxy resin and the hardener may be a two-component system (e.g., a binary mixture). For example, the epoxy resin and the hardener are in separate containers until ready for use. To generate the adhesive 78, the epoxy resin and the hardener are mixed together to form the adhesive 78 prior to inserting the electrochemical cells 44 into the housing 42, as discussed in further detail below with reference to FIGS. 5-7.

Figure 5:
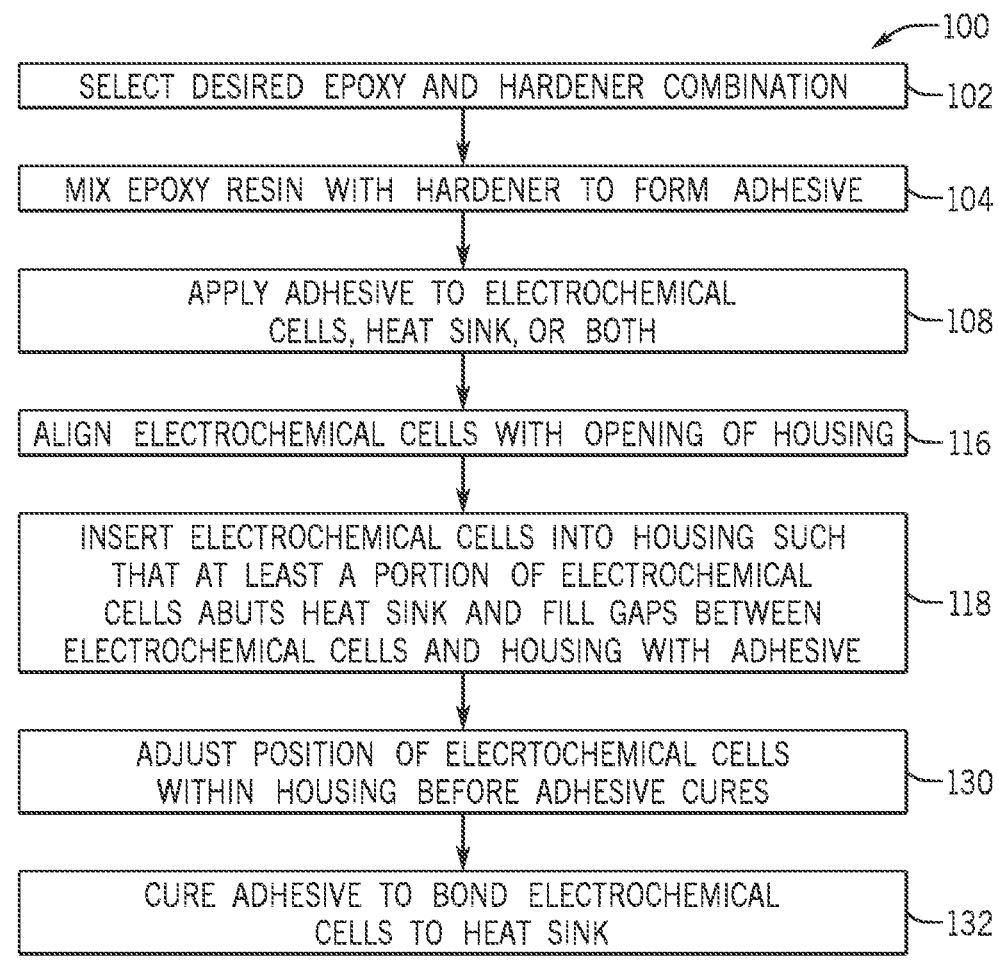
FIG. 5 is a flow chart of an embodiment of a method that may be used to secure the electrochemical cells within the housing of the lithium ion battery module using the adhesive in accordance with aspects of the present disclosure.

FIG. 5 is a flow chart of method 100 that may be used to couple at least a portion of the electrochemical cells 44 to the heat sink 80. The method 100 begins by selecting (block 102) a desired epoxy and hardener combination and mixing (block 104) the selected epoxy resin with the selected hardener to form the adhesive 78. As discussed above, the adhesive 78 may be a two-component system. That is, the epoxy resin and the hardener are in separate containers until ready for use. For example, the epoxy resin and the hardener may be mixed at a ratio of approximately 1:1 and approximately 3:2 by weight. For example, the thermal epoxy resin to hardener ratio may be approximately 1:1, 1.5:1, 2:1, 2.2:1, 2.5:1, 3:1, 1:1.5, 1:2, and so forth up to 3:2. By mixing the thermal epoxy resin and the hardener at a ratio between of approximately 1:1 and approximately 3:2, the adhesive 78 may have the desired working life and cure time discussed above.

The method also includes applying (block 108) the adhesive 78 to the electrochemical cells 44, the heat sink 80, or both. As discussed above, the adhesive 78 may be applied to the surfaces 74, 82 via a dispenser, a brush, dip coating (e.g., dipping the surface 74 in a solution of the adhesive 78), or any other suitable application method. For example, FIG. 6 illustrates the manner in which the adhesive 78 may be dispensed onto the heat sink surface 82 in accordance with block 108. The adhesive 78 may be applied at multiple locations along the dimension 81 of the heat sink 80. The adhesive 78 may be applied automatically or by a technician assembling the battery module 28. In certain embodiments, the adhesive 78 is applied as a discontinuous layer on the surface 74, 82. For example, as illustrated in FIG. 6, the adhesive 78 may be applied as separate droplets 110 onto the surface 74, 82. In other embodiments, the adhesive 78 is applied as a continuous layer onto the surface 74, 82. Once applied, the adhesive 78 may cover between approximately 25% and approximately 100% of a total surface area of the second cell surface 74 and/or the heat sink surface 82. As discussed above, the viscosity of the adhesive 78 is such that the adhesive 78 is easily dispersed along the surfaces 74, 82 (e.g., as shown by arrows 112) when the electrochemical cells 44 are inserted into the housing 42 (e.g., as shown by arrow 114).

Returning to the method 100 of FIG. 5, the method 100 further includes aligning (block 116) the electrochemical cells 44 with the opening 62 of the housing 42 and inserting (block 118) the electrochemical cells 44 into the opening 62 such that at least a portion of the second cell surfaces 74 abut the heat sink surface 82. This positioning pressure is also shown in FIG. 6. FIG. 6 illustrates the interface between the electrochemical cells 44 and the heat sink 80. In the illustrated embodiment, the electrochemical cells 44 exert a force 120 on the heat sink surface 82 such that adhesive 78 is dispersed along the surfaces 74, 82 and forms a continuous adhesive layer 122 between the surfaces 74, 82. Additionally, the force 120 may disperse the adhesive 78 into gaps (e.g., a gap 124) between the cells stacks 50 and/or between the interior surface 72 of the housing 42 and the cell stack surface 70. Once the electrochemical cells 44 are inserted into the housing 42, the adhesive 78 may be dispersed a distance 123 along side surfaces 125 of the electrochemical cells 44. For example, the adhesive 78 may cover between approximately 1% and approximately 5% of the side surfaces 125 of the electrochemical cells 44. As such, the adhesive 78 may be localized at the interface of the electrochemical cells 44 and the heat sink 80.

In certain embodiments, the adhesive 78 may be self-leveling. That is, once the adhesive 78 is applied to the surface 74, 82, the adhesive 78 may disperse on the surfaces 74, 82, 125 without the use of tools to spread the adhesive 78 along the surface 74, 82 and into the gaps (e.g., the gap 124). Therefore, the second cell surface 74 may not need to abut the heat sink surface 82 to disperse the adhesive 78 along the surfaces 74, 82 and the gaps.

In certain embodiments, the adhesive 78 may be heated to facilitate dispersion along the surfaces 74, 82. For example, as illustrated in FIG. 7, heat 128 is applied to the battery module 28. The heat 128 may be applied to the heat sink 80, the electrochemical cells 44, or both, before, during, or after application of the adhesive 78 onto the surface 74, 82. In one embodiment, the heat 128 is applied to the surface 74, 82 (e.g., via the electrochemical cells 44 or the heat sink 80) that is facing the surface 74, 82 where the adhesive 78 is applied. This may be useful for dispersing and accelerating the cure time of the adhesive 78 after the surfaces 74, 82 are in contact with one another. In another embodiment, the heat 128 may be applied to the same surface 74, 82 where the adhesive 78 is applied. This may be useful, for example, when the viscosity of the adhesive 78 is above a desired range. Further, in some embodiments, the heat 128 is applied to both the surfaces 74, 82 concurrently. The heat 128 may decrease the viscosity of the adhesive 78 such that a fluidity of the adhesive 78 increases compared to a fluidity of the adhesives 78 that are not heated.

Returning to the method 100 of FIG. 5, the method 100 further includes adjusting (block 130) a position of the electrochemical cells 44 relative to the heat sink 80 before the adhesive 78 fully cures (e.g., during the working life of the adhesive 78). For example, during assembly, the electrochemical cells 44 may be adjusted to align the terminals 60 with other components (e.g., the bus bar 54 and/or housing 48) of the battery module 28. As discussed above, the adhesive 78 may have a working life of greater than or equal to approximately 60 minutes to allow adjustments of the electrochemical cells 44 after insertion into the housing 42.

The method 100 also includes curing (block 132) the adhesive 78 to bond the electrochemical cells 44 to the heat sink 80. For example, once the electrochemical cells 44 are in a desired position within the housing 42, the adhesive 78 begins to cure and develop bond strength over time. As the adhesive 78 cures, the adhesive 78 bonds to the surfaces 74, 82 and secures the electrochemical cells 44 to the heat sink 80. This securement, including under the operating conditions of the battery module 28, blocks movement of the 50 of the electrochemical cells 44 within the housing 42. As such, stress on the terminals 60 and/or first cell surface 62 of the electrochemical cells 44 that may be caused by the movement of the cell stacks 50 within the housing 42 may be mitigated.

In certain embodiments, heat may be applied to accelerate curing of the adhesive 28. For example, the heat sink 80 may be coupled to a heat source that may be used to apply indirect heat to the adhesive 78 (e.g., via the heat sink 80), thereby accelerating curing of the adhesive 78. The heat may be applied at any time after the electrochemical cells 44 are properly positioned within the housing 42. While the present embodiments are described in the context of a binary adhesive system (e.g., a two-component system that includes the epoxy resin and hardener), the adhesive may be a radiation-activated epoxy resin. In this particular embodiment, the adhesive 78 may not include a hardener to initiate curing. Rather, the adhesive 78 may be cured using radiation (e.g., ultraviolet (UV) radiation). Upon exposure to the radiation, the adhesive begins to harden.

As set forth above, one or more of the disclosed embodiments, alone or in combination, may provide one or more technical effects useful in the manufacture of the battery module and associated use of aluminum-to-aluminum adhesives. For example, certain embodiments of the present approach may facilitate assembly of the battery modules during manufacturing. By specific example, the epoxy adhesive may couple the electrochemical cells to a heat sink of the battery system. As such, the undesirable movement of the electrochemical cells within the housing, in particular a portion of the electrochemical cells that is opposite the electrode terminals, may be mitigated. Therefore, durability of the battery module may be increased, thereby reducing costs associated with replacement of the battery module compared to battery modules that do not have the disclosed adhesive. The technical effects and technical problems in the specification are examples and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A battery module comprising:
    a housing comprising a first material;
    an electrochemical cell disposed in the housing, the electrochemical cell comprising a first cell surface having electrode terminals and a second cell surface substantially opposite the first cell surface;
    a heat sink integral with a portion of the housing and comprising a second material different from the first material, the heat sink having a heat sink surface facing the second cell surface;
    a thermally conductive adhesive configured to bond the second cell surface and the heat sink surface, the thermally conductive adhesive comprising a mixture of an epoxy resin and a hardener, with the epoxy resin having a viscosity between approximately 40,000 centipoise (cP) and approximately 50,000 cP at 25 degrees centigrade and with the hardener having a second viscosity of between greater than 35,000 cP and 50,000 cP at 25° C.; and
    the thermally conductive adhesive having a bonding shear strength and a bonding tensile strength between the electrochemical cell and the heat sink of between approximately 5 megaPascals (MPa) and approximately 50 MPa at 25 degrees Celsius.

2. The battery module of claim 1, wherein the mixture is configured to cure in less than or equal to approximately 24 hours.

3. The battery module of claim 1, wherein the mixture comprises a weight ratio of between approximately 1:1 and approximately 2:1 epoxy resin to hardener.

4. The battery module of claim 1, wherein the portion of the housing is a base portion disposed substantially opposite an opening of the housing.

5. The battery module of claim 1, wherein the thermally conductive adhesive comprises a radiation-activated epoxy resin.

6. The battery module of claim 1, wherein the thermally conductive adhesive comprises a thermal conductivity between approximately 0.5 Watt/meter Kelvin (W/mK) and approximately 2.0 W/mK.

7. The battery module of claim 1, wherein the thermally conductive adhesive is self-leveling.

8. The battery module of claim 1, wherein the thermally conductive adhesive has a working life of between approximately 1 hour and approximately 3 hours.

9. The battery module of claim 1, wherein the thermally conductive adhesive comprises a hardness equal to approximately 80 Shore D.

10. The battery module of claim 1, further comprising an additional electrochemical cell disposed in the housing, wherein the additional electrochemical cell comprises a third cell surface having electrode terminals and a fourth cell surface substantially opposite the third cell surface, wherein a gap is formed between the electrochemical cell and the additional electrochemical cell in the housing, and wherein the thermally conductive adhesive extends into the gap such that the thermally conductive adhesive is configured to conform to the electrochemical cell and the additional electrochemical cell to compensate for variability in dimensions of the electrochemical cell and the additional electrochemical cell.

11. The battery module of claim 1, wherein the thermally conductive adhesive having a coefficient of thermal expansion between 0.5 ppm/degrees Celsius and 40 ppm/degrees Celsius.

12. A battery module, comprising:
    a plurality of electrochemical cells secured to a heat sink coupled to a housing of the battery module, wherein the heat sink extends in at least one direction to an outermost dimension of the housing, and wherein each electrochemical cell of the plurality of electrochemical cells is in secured connection with the heat sink; and
    a thermally conductive adhesive positioned at an interface between the plurality of electrochemical cells and the heat sink, wherein;
    the thermally conductive adhesive comprising an epoxy resin and a hardener, with the epoxy resin having a viscosity between approximately 40,000 centipoise (cP) and approximately 50,000 cP at 25 degrees centigrade and with the hardener having a second viscosity of between greater than 35,000 cP and 50,000 cP at 25° C.; and
    the thermally conductive adhesive providing for the secured connection of the plurality of electrochemical cells with the heat sink at the interface, with the thermally conductive adhesive having a bonding shear strength and a bonding tensile strength between the plurality of electrochemical cells and the heat sink of between approximately 5 megaPascals (MPa) and approximately 50 MPa at 25 degrees Celsius.

13. The battery module of claim 12, wherein the thermally conductive adhesive has a thermal conductivity between approximately 0.5 Watt/meter Kelvin (W/mK) and approximately 2.0 W/mK.

14. The battery module of claim 12, wherein the thermally conductive adhesive comprises a mixture of the epoxy resin and the hardener.

15. The battery module of claim 14, wherein the mixture has a weight ratio of between approximately 1:1 and 2:1 epoxy resin to hardener.

16. The battery module of claim 12, wherein the thermally conductive adhesive has a hardness equal to approximately 80 Shore D after curing.

17. The battery module of claim 12, wherein a thickness of the thermally conductive adhesive along the interface is substantially uniform after curing.

18. The battery module of claim 12, wherein the thermally conductive adhesive is self-leveling.

19. The battery module of claim 12, wherein the thermally conductive adhesive has a working life of between approximately 1 hour and approximately 3 hours.

20. The battery module of claim 12, wherein the thermally conductive adhesive having a coefficient of thermal expansion between 0.5 ppm/degrees Celsius and 40 ppm/degrees Celsius.

\* \* \* \* \*